Figure 1:
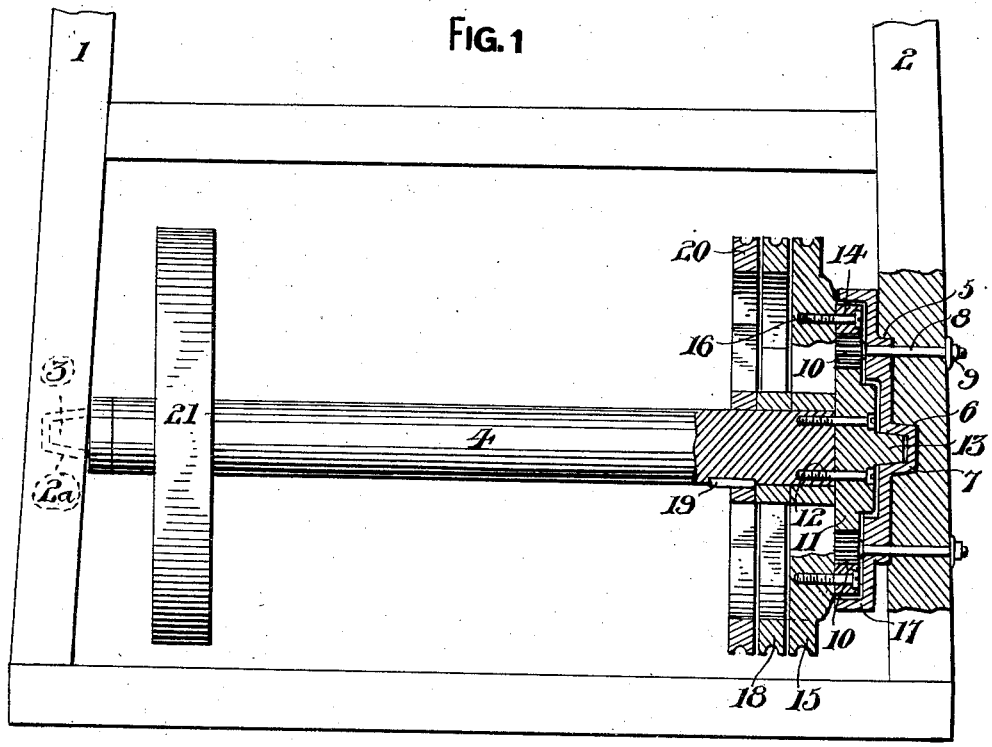

C. W. BELL & S. P. HILLWIG.
WHEEL.
APPLICATION FILED FEB. 24, 1913.

1,079,828.

Patented Nov. 25, 1913.

WITNESSES

INVENTORS
C. W. Bell
S. P. Hillwig

ATTORNEY

UNITED STATES PATENT OFFICE.

CHARLES WASHINGTON BELL, OF CHICORA, AND SAMUEL P. HILLWIG, OF KAYLOR, PENNSYLVANIA.

WHEEL.

1,079,828.  Specification of Letters Patent.  Patented Nov. 25, 1913.

Application filed February 24, 1913. Serial No. 750,443.

*To all whom it may concern:*

Be it known that we, CHARLES WASHINGTON BELL and SAMUEL P. HILLWIG, citizens of the United States of America, residing, respectively, at Chicora and Kaylor, in the counties of Butler and Armstrong and State of Pennsylvania, have invented certain new and useful Improvements in Wheels, of which the following is a specification, reference being had therein to the accompanying drawing.

This invention relates to wheels and more particularly to that type of wheel commonly styled a "bull" and forming part of a derrick and machinery used in oil well fields.

The primary object of our invention is to provide a reversible bull wheel that obviates the necessity of using complicated clutches and other mechanisms whereby a rotary movement can be imparted to a bull wheel in a desired direction.

Another object of this invention is to furnish a bull wheel with three elements, two of which operate in unison or in opposite directions, while the third is an idler, but coöperates with the first mentioned elements in facilitating operations in connection with a string of drilling tools.

A further object of this invention is to provide a bull wheel consisting of comparatively few parts that are inexpensive to manufacture, easy to assemble, not liable to injury by ordinary use and highly efficient for the purposes for which they are intended.

With the above and other objects in view the invention resides in the novel construction, combination and arrangement of parts to be hereinafter specifically described and then claimed.

Reference will now be had to the drawing, wherein:—

Figure 2:
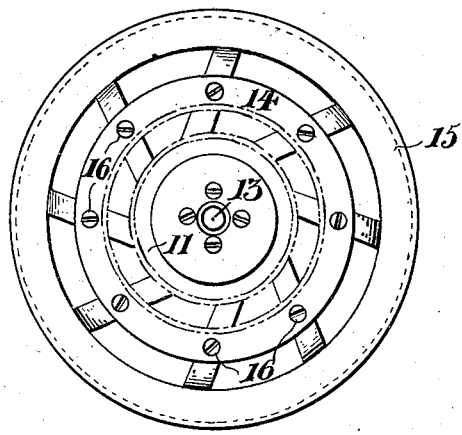
Figure 3:
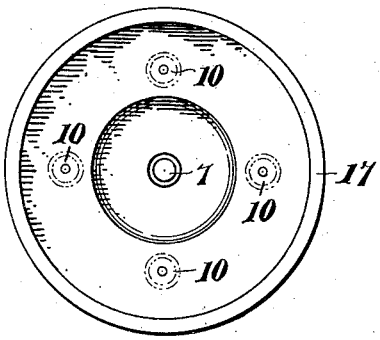

Figure 1 is a front elevation of the bull wheel partly broken away and partly in section. Fig. 2 is a side elevation of a portion of the bull wheel, and Fig. 3 is a similar view of a bearing.

Further describing my invention in detail with reference to the accompanying drawing, wherein like numerals denote correspond parts throughout: 1 and 2 denote the frames of a derrick and mounted in the frame 1 is a socket bearing 2ª for the spindle or pintle 3 of a bull wheel axle or shaft 4.

The frame 2 is recessed, as at 5 and 6 to accommodate a circular socket bearing 7 that is secured in the recessed portion of the frame 2 by tie rods 8, and nuts 9 or other fastening means. The inner ends of the tie rods 8 constitute bearings or stud shafts for revoluble pinions 10 that mesh with a gear wheel 11 secured to the end of the axle 4 by screw bolts 12 or other fastening means. The hub 13 of the gear wheel 11 extends into the socket bearing 7 and said socket bearing coöperates with the socket bearing 2ª in revolubly supporting the shaft 4.

Meshing with the pinions 10 is a circular rack 14 of a circumferentially grooved pulley 15 that is loosely mounted upon the shaft 4 adjacent to the gear wheel 11. The rack 14 is secured to the outer side of the pulley by screw bolts 16 or other fastening means and said rack is inclosed by the annular flange 17 of the bearing 7.

Loosely mounted upon the shaft 4 adjacent to the pulley 15 is a circumferentially grooved idle pulley 18 and keyed or otherwise mounted, as at 19 upon the shaft 4 adjacent to the idle pulley 18 is a grooved pulley 20 that moves in unison with the shaft 4.

Under ordinary conditions a pulley wheel is employed for raising and lowering a string of drilling tools and it is a common practice to use a clutch for controlling the direction of rotation of said wheel. Instead of resorting to the use of a clutch we drive the axle 4 in one direction through the medium of a belt wheel 21. With a drill rope upon the pulley 20 a string of tools can be elevated and with the same rope shifted to the pulley 15 a string of tools can be lowered, as it is through the rack 14, pinions 10 and gear wheel 11 that the pulley 15 is revolved in a reverse direction from the pulley 20.

When it is desired to make any changes in the string of tools, it is not necessary that there be a cessation in the operation of the shaft 4, as the drill cable or rope (not shown) can be shifted to the idle pulley 18.

We reserve the right to use any suitable means for shifting a rope or cable from one pulley to another, and while in the drawing there is illustrated a preferred embodiment of the invention, it is to be understood that the structural elements are susceptible to such variations and modifications as fall within the scope of the appended claim.

What we claim is:—

A bull wheel comprising the combination with a pair of supports, of a socket bearing carried by one of said supports, a flanged plate mounted in the other of said supports and provided with a socket bearing, a shaft journaled in the first mentioned bearing, a gear wheel abutting against and secured to the other end of said shaft and having a hub journaled in the said second mentioned socket bearing, pinions engaging with said gear, means for securing said plate in position and supporting said pinions, a grooved pulley fixed to said shaft, an idler pulley loosely mounted upon the shaft, a pulley loosely mounted upon the shaft and provided with a rack extending into said plate and engaging the said pinions.

In testimony whereof we affix our signatures in the presence of two witnesses.

CHARLES WASHINGTON BELL.
SAMUEL P. HILLWIG.

Witnesses:
WM. F. BUTLER,
JOHN H. DAVIS.

Copies of this patent may be obtained for five cents each, by addressing the "Commissioner of Patents, Washington, D. C."